(12) United States Patent
Thoen

(10) Patent No.: US 11,580,178 B2
(45) Date of Patent: Feb. 14, 2023

(54) METHODS FOR THREE-DIMENSIONAL SEARCHING TO PRECISELY TARGET RETRIEVAL WITHIN DIVERSE TYPES OF CONTENT AND DEVICES THEREOF

(71) Applicant: CGI Communications, Inc., Rochester, NY (US)

(72) Inventor: Gregory S. Thoen, Penfield, NY (US)

(73) Assignee: CGI COMMUNICATIONS, INC., Rochester, NY (US)

( * ) Notice: Subject to any disclaimer, the term of this patent is extended or adjusted under 35 U.S.C. 154(b) by 0 days.

(21) Appl. No.: 17/172,556

(22) Filed: Feb. 10, 2021

(65) Prior Publication Data

US 2021/0248194 A1 Aug. 12, 2021

Related U.S. Application Data

(60) Provisional application No. 62/972,493, filed on Feb. 10, 2020.

(51) Int. Cl.
| | |
|---|---|
| *G06F 16/00* | (2019.01) |
| *G06F 16/953* | (2019.01) |
| *H04L 67/146* | (2022.01) |
| *H04L 67/02* | (2022.01) |
| *G06F 16/33* | (2019.01) |
| *G06F 16/63* | (2019.01) |
| *G06F 16/73* | (2019.01) |
| *G06F 16/955* | (2019.01) |

(52) U.S. Cl.
CPC ........ *G06F 16/953* (2019.01); *G06F 16/3331* (2019.01); *G06F 16/63* (2019.01); *G06F 16/73* (2019.01); *G06F 16/9566* (2019.01); *H04L 67/02* (2013.01); *H04L 67/146* (2013.01)

(58) Field of Classification Search
CPC .... G06F 16/953; G06F 16/3331; G06F 16/63; G06F 16/73; G06F 16/9566; G06F 16/957; H04L 67/02; H04L 67/146
See application file for complete search history.

(56) References Cited

U.S. PATENT DOCUMENTS

| | | | | |
|---|---|---|---|---|
| 2004/0031054 | A1* | 2/2004 | Dankworth | .... H04N 21/234381 725/86 |
| 2010/0332515 | A1* | 12/2010 | Carraher | ............... G06F 16/951 707/769 |
| 2015/0127626 | A1* | 5/2015 | Park | .................... G06F 16/7837 707/706 |
| 2020/0004782 | A1* | 1/2020 | Pereira | ...................... G06T 7/11 |

* cited by examiner

*Primary Examiner* — Jared M Bibbee
(74) *Attorney, Agent, or Firm* — Troutman Pepper Hamilton Sanders LLP (Rochester)

(57) ABSTRACT

Methods, non-transitory computer readable media, and computing devices for three-dimensional searching that precisely targets retrieval within diverse types of content includes retrieving web content in response to a received request from a client device. A destination page, an address within the page, and an offset distance from a starting point at the address to a correlated responsive portion of the web content to the received request is identified. The responsive web content with the identified destination page, the address, and the offset distance is provided to the requesting client device.

12 Claims, 4 Drawing Sheets

METHODS FOR THREE-DIMENSIONAL SEARCHING TO PRECISELY TARGET RETRIEVAL WITHIN DIVERSE TYPES OF CONTENT AND DEVICES THEREOF

This application claims the benefit of U.S. Provisional Patent Application Ser. No. 62/972,493, filed Feb. 10, 2020, which is hereby incorporated by reference in its entirety.

FIELD

This technology relates to methods, non-transitory computer readable media and devices that enable three-dimensional searching to precisely target retrieval within diverse types of content across websites.

BACKGROUND

Traditional web searching is one-dimensional. By way of example, when a phrase is input into a web search engine, then the results for that searched phrase by the web search engine are simply provided as a list of different page locations which contain the phrase. In particular, each of these results in the list is one dimensional, i.e. each of these results is directed to a top location of the identified web page where the web search engine believes the result exists within the web page without any further precision. As a result, often when results are accessed, further effort by the end user to scroll down from the top of the web page is required to hopefully find the particular desired result from the initially initiated search. Accordingly, this often can be quite time consuming and tedious for the end user.

Prior solutions to address this issue have included initiation of a further search within the identified web page through the engagement a 'ctrl-f' command, reentry of the previously searched phrase again, and then initiation of that further search for that phrase within the web page. Although helpful, this process is still time consuming and tedious and requires further action and inputs from the end user. Additionally, this approach is not able to search within certain types of content which may be identified in the results of the search, such as video content where a relevant ten minutes of video content may be buried within two hours of video content.

SUMMARY

A method for three-dimensional searching to precisely target retrieval within diverse types of content includes retrieving, by a computing device, web content in response to a received request from a client device. A destination page, an address within the page, and an offset distance from a starting point at the address to a correlated responsive portion of the web content to the received request is identified, by the computing device. The responsive web content with the identified destination page, the address, and the offset distance is provided to the requesting client device, by the computing device.

A computing device, comprising memory comprising programmed instructions stored thereon and one or more processors configured to be capable of executing the stored programmed instructions to retrieve web content in response to a received request from a client device. A destination page, an address within the page, and an offset distance from a starting point at the address to a correlated responsive portion of the web content to the received request is identified. The responsive web content with the identified destination page, the address, and the offset distance is provided to the requesting client device.

A non-transitory computer readable medium having stored thereon instructions comprising executable code which when executed by one or more processors, causes the one or more processors to retrieve web content in response to a received request from a client device. A destination page, an address within the page, and an offset distance from a starting point at the address to a correlated responsive portion of the web content to the received request is identified. The responsive web content with the identified destination page, the address, and the offset distance is provided to the requesting client device.

This technology provides a number of advantages including providing methods, non-transitory computer readable media, and devices that enable effective three-dimensional searching to precisely target retrieval within diverse types of content across websites. With examples of this technology, an end user can be precisely guided to an exact space or time where a relevant portion of diverse content responsive to the search request is located. Additionally, with example of this technology a search of diverse content can be initiated via any input format for content in any format, such as voice as input to search for text, text as input to search for video, or voice to search for video or audio segments by way of example only.

DETAILED DESCRIPTION

Figure 1:
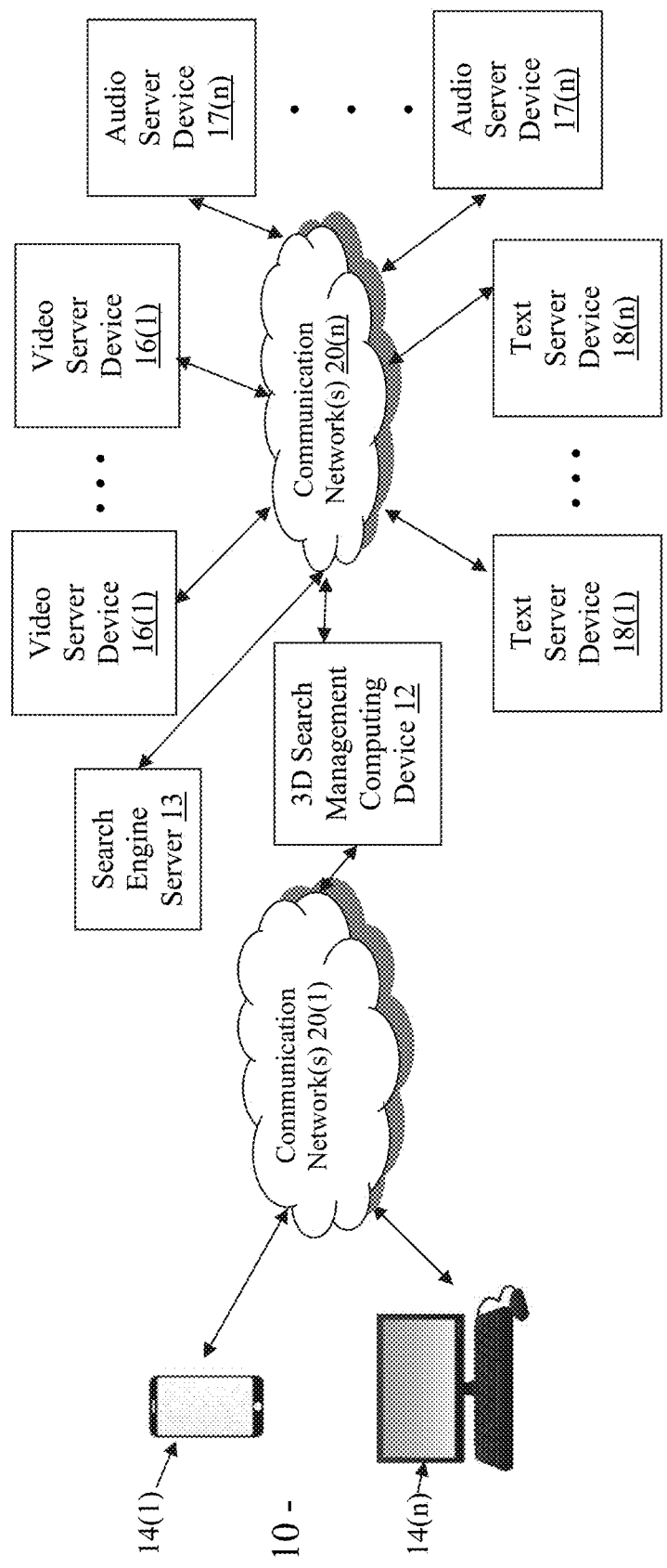
FIG. 1 is a block diagram of an environment with an example of a three-dimensional (3D) search management computing device that enables three-dimensional searching to precisely target retrieval within diverse types of content across websites.

An exemplary environment 10 with a three-dimensional (3D) search management computing device 12 that enables three-dimensional searching to precisely target retrieval within diverse types of content is illustrated in FIG. 1. In this example, the environment includes the three-dimensional (3D) search management computing device 12, search engine server 13, a plurality of client devices 14(1)-14(n), a plurality of video server devices 16(1)-16(n), a plurality of audio server devices 17(1)-17(n), and a plurality of text server devices 18(1)-18(n) coupled together via one or more communication network(s) 20(1)-20(n), although the environment may have other types and/or numbers of other systems, devices or other elements in other configurations. Additionally, the environment 10 may include other network devices such as one or more routers and/or switches, for example, which are well known in the art and thus will not be described herein. This technology provides a number of advantages including methods, non-transitory computer readable media, and computing devices that enable effective three-dimensional searching to precisely target retrieval within diverse types of content across web sites.

Figure 2:
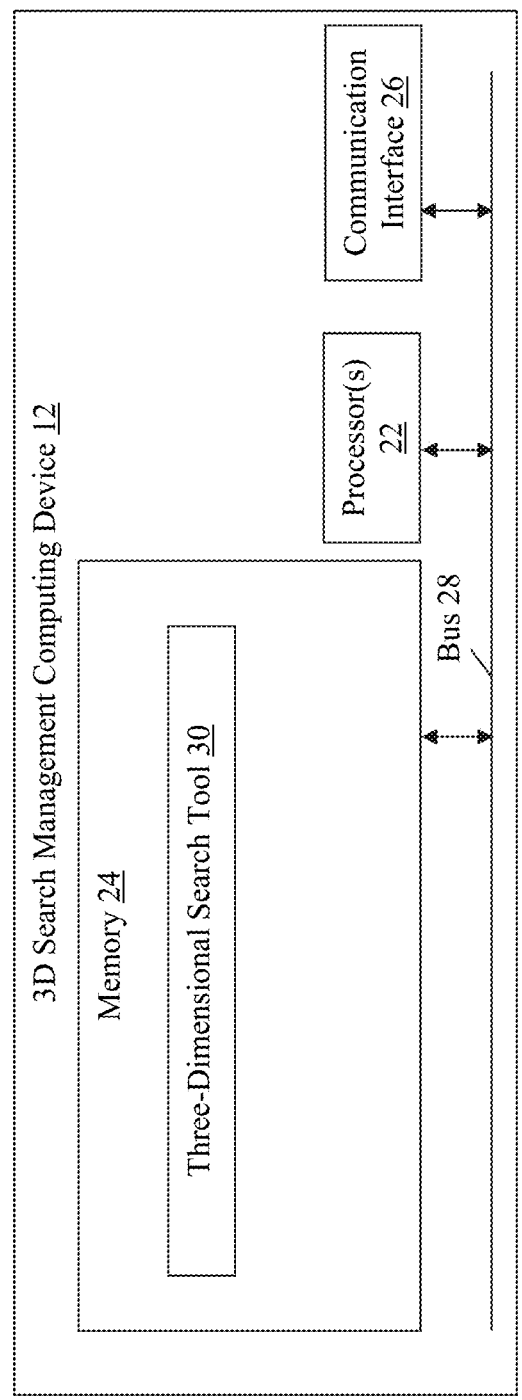
FIG. 2 is a block diagram of the 3D search management computing device that enables three-dimensional searching to precisely target retrieval within diverse types of content shown in FIG. 1.

Referring to FIGS. 1-2, the 3D search management computing device 12 may perform any number of functions including enabling effective three-dimensional searching to precisely target retrieval within diverse types of content across websites. For ease of illustration with this example, one 3D search management computing device 12 is shown, although in other examples other numbers and/or types of 3D search management computing devices may be used. The 3D search management computing device 12 includes one or more processor(s) 22, a memory 24, and a communication interface 26, which are coupled together by a bus or other communication link 28, although the 3D search management computing device 12 can include other types and/or numbers of elements in other configurations.

The processor(s) 22 of the 3D search management computing device 12 may execute programmed instructions stored in the memory 24 of the 3D search management computing device 12 for the any number of the functions identified above. The processor(s) 22 of the 3D search management computing device 12 may include one or more CPUs or general purpose processors with one or more processing cores, for example, although other types of processor(s) can also be used.

The memory 24 of the 3D search management computing device 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 24.

Figure 3:
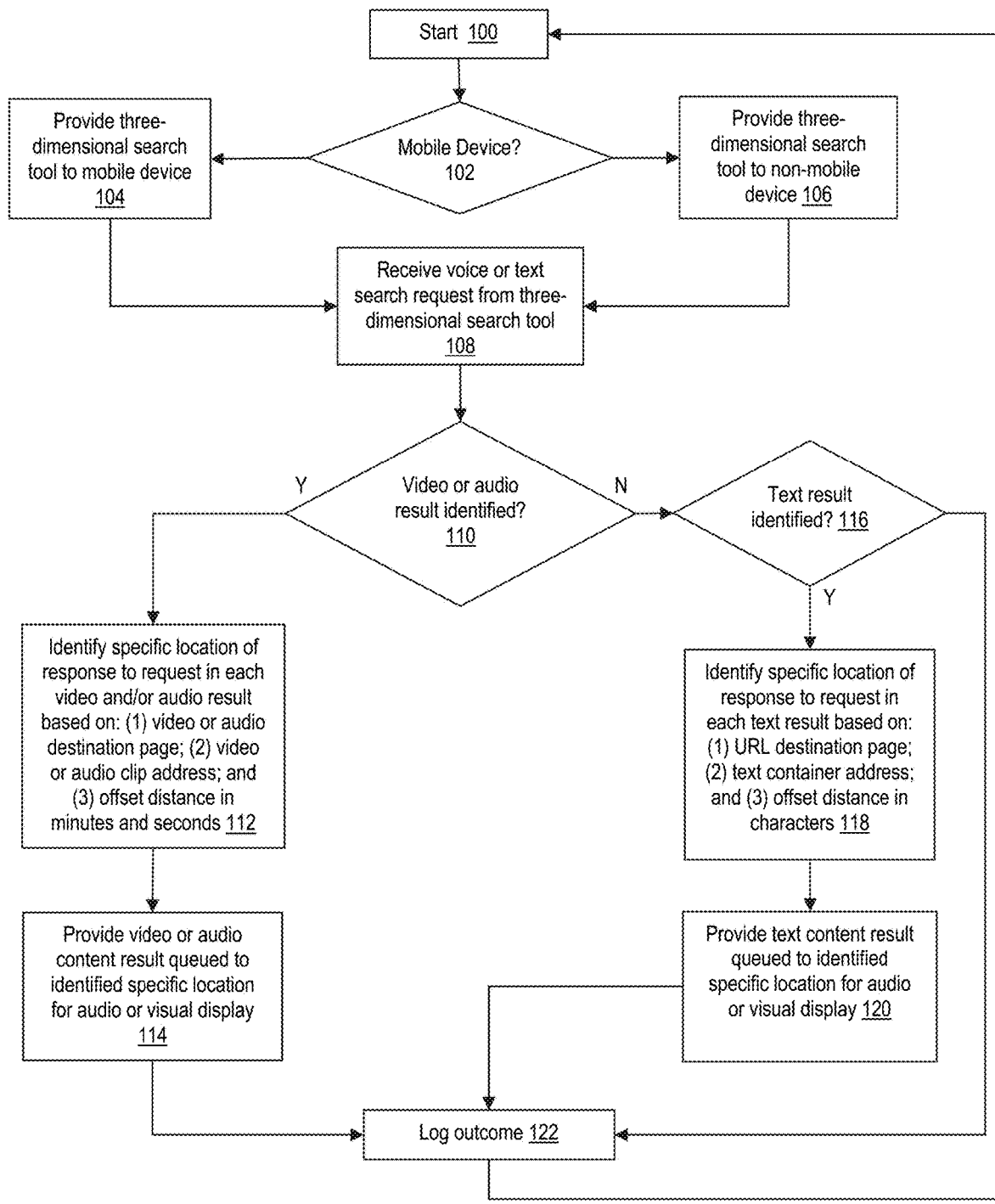
FIG. 3 is a flow chart of an example of a method for three-dimensional searching to precisely target retrieval within diverse types of content across websites.

Accordingly, the memory 24 of the 3D search management computing device 12 can store one or more applications that can include computer executable instructions that, when executed by the 3D search management computing device 12, cause the 3D search management computing device 12 to perform actions, such as to transmit, receive, and/or otherwise process requests and responses for web content as well as other search engine functions, for example, and to perform other actions as illustrated and described with reference to FIG. 3 by way of example. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the 3D search management computing device 12 itself, may be located in virtual server(s) running in a cloud-based computing environment rather than being tied to one or more specific physical network computing devices. Also, the application(s) may be running in one or more virtual machines (VMs) executing on the 3D search management computing device 12. Additionally, in one or more embodiments of this technology, virtual machine(s) running on the 3D search management computing device 12 may be managed or supervised by a hypervisor.

In this particular example, the memory 24 of the 3D search management computing device 12 includes programmed instructions for a three-dimensional (3D) search tool 30, although the memory 24 can include other types and/or numbers of other policies, modules, engines, tools, databases, or applications, for example. In this example, three-dimensional search tool 30 enables three-dimensional searching of indexed content from the search engine server 13 to provide precisely targeted retrieval within diverse types of content as illustrated and described by way of the examples herein. One or more aspects of the three-dimensional search tool 30 may be downloaded or otherwise provided to one or more of the user computing devices 12(1)-12(n), such as an interactive dashboard to facilitate engagement of this three-dimensional searching of content to provide precisely targeted retrieval within diverse types of content by way of example only.

The communication interface 26 of the 3D search management computing device 12 operatively couples and communicates between the 3D search management computing device 12 and the search engine server 13, the client devices 14(1)-14(n), the video server devices 16(1)-16(n), the audio server devices 17(1)-17(n), and the text server devices 18(1)-18(n), which are all coupled together by the communication network(s) 20(1)-20(n), although other types and/or numbers of communication networks or systems with other types and/or numbers of connections and/or configurations to other devices and/or elements can also be used.

By way of example only, the communication network(s) 20(1)-20(n) can include local area network(s) (LAN(s)) or wide area network(s) (WAN(s)), and can use TCP/IP over Ethernet and industry-standard protocols, although other types and/or numbers of protocols and/or communication networks can be used. The communication network(s) 20(1)-20(n) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the 3D search management computing device 12 is illustrated in this example as including a single device, the 3D search management computing device 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the 3D search management computing device 12.

Additionally, one or more of the devices that together comprise the 3D search management computing device 12 in other examples can be standalone devices or integrated with one or more other devices or apparatuses, such as one of the server devices, for example. Moreover, one or more of the devices of the 3D search management computing device 12 in these examples can be in a same or a different communication network including one or more public, private, or cloud networks, for example.

The search engine server 13 in this example may include one or more processors, a memory, and a communication interface, which are coupled together by a bus or other communication link(s), although other numbers and/or types of components or other elements may be used, In this particular example, the memory of the search engine server 13 may include programmed instructions for web crawlers and a search engine to be executed by the processor, although the memory can include other types and/or numbers of other policies, modules, engines, tools, databases, or applications, for example. In this example, the web crawlers comprise programs or automated scripts which browse the World Wide Web, such as video server devices 16(1)-16(n), the audio server devices 17(1)-17(n), and the text server devices 18(1)-18(n) by way of example, in a methodical, automated manner mainly to create a copy of all visited pages for later processing by a search engine, that will index the downloaded pages to provide fast searches, although other types and/or other functions to support the 3D search management computing device 12 may be executed. Additionally, in this example the search engine executes indexing to store and organize the content found during the crawling process by the web crawlers and also to rank and provide received search request, although other types and/or other functions to support the search engine server 13 may be executed.

Each of the client devices 14(1)-14(n) in this example may include one or more processors, a memory, keyboard, computer mouse, display, and a communication interface, which are coupled together by a bus or other communication link(s), although other numbers and/or types of components or other elements may be used. The client devices 14(1)-14(n) may run interface applications, such as standard Web browsers or standalone client applications, which may provide an interface to make requests for, and receive content stored on, one or more of the video server devices 16(1)-16(n), the audio server devices 17(1)-17(n), and the text server devices 18(1)-18(n) via the communication network(s) 20(1)-20(n). Various applications may be operating on the client devices 14(1)-14(n), such as aspects or all of the three-dimensional search tool by way of example only, and may transmit requests for content (e.g., video, audio, and/or text web content) to, for example, one of the video server devices 16(1)-16(n), the audio server devices 17(1)-17(n), or the text server devices 18(1)-18(n) via the 3D search management computing device 12. A variety of different types of computing devices can be used for the client devices 14(1)-14(n), such as the smartphone and desktop computing system illustrated in FIG. 1 by way of example only.

Each of the video server devices 16(1)-16(n), the audio server devices 17(1)-17(n), and the text server devices 18(1)-18(n) in this example may include one or more processors, a memory, and a communication interface, which are coupled together by a bus or other communication link, although other numbers and/or types of network devices could be used. Additionally, each of the video server devices 16(1)-16(n), the audio server devices 17(1)-17(n), and the text server devices 18(1)-18(n) in this example may process requests received from the client devices 14(1)-14(n) via the communication network(s) according to the HTTP-based application RFC protocol, for example. Various applications may be operating on each of the video server devices 16(1)-16(n), the audio server devices 17(1)-17(n), and the text server devices 18(1)-18(n). Further, each of the video server devices 16(1)-16(n), the audio server devices 17(1)-17(n), and the text server devices 18(1)-18(n) may be hardware or software or may represent a system with multiple servers in a pool, which may include internal or external networks. In this particular example for ease of illustration, the video server devices 16(1)-16(n), the audio server devices 17(1)-17(n), and the text server devices 18(1)-18(n) each store video web content, audio web content or text web content, respectively, although in other examples other types and/or combinations of different diverse content may be stored on one or more of the different video server devices 16(1)-16(n), audio server devices 17(1)-17(n), and/or text server devices 18(1)-18(n).

Although each of the video server devices 16(1)-16(n), the audio server devices 17(1)-17(n), and the text server devices 18(1)-18(n) are illustrated as single devices, one or more actions of each of the video server devices 16(1)-16(n), the audio server devices 17(1)-17(n), and the text server devices 18(1)-18(n) may be distributed across one or more distinct network computing devices that together comprise one or more of the server devices. Moreover, each of the video server devices 16(1)-16(n), the audio server devices 17(1)-17(n), and the text server devices 18(1)-18(n) are not limited to a particular configuration. Thus, each of the video server devices 16(1)-16(n), the audio server devices 17(1)-17(n), and the text server devices 18(1)-18(n) may contain a plurality of network computing devices that operate using a master/slave approach, whereby one of the network computing devices of the video server devices 16(1)-16(n), the audio server devices 17(1)-17(n), and the text server devices 18(1)-18(n) operate to manage and/or otherwise coordinate operations of the other network computing devices. The video server devices 16(1)-16(n), the audio server devices 17(1)-17(n), and the text server devices 18(1)-18(n) may also operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

Although the exemplary environment 10 with the 3D search management computing device 12, the search engine server 13, the client devices 14(1)-14(n), the video server devices 16(1)-16(n), the audio server devices 17(1)-17(n), the text server devices 18(1)-18(n), and communication network(s) 20(1)-20(n) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the 3D search management computing device 12, the search engine server 13, the client devices 14(1)-14(n), the video server devices 16(1)-16(n), the audio server devices 17(1)-17(n), and the text server devices 18(1)-18(n), for example, may be configured to operate as virtual instances on the same physical machine. In other words, one or more of the 3D search management computing device 12, the search engine server 13, the client devices 14(1)-14(n), the video server devices 16(1)-16(n), the audio server devices 17(1)-17(n), and the text server devices 18(1)-18(n) may operate on the same physical device rather than as separate devices communicating through communication network(s). Additionally, there may be more or fewer 3D search management computing device 12, the search engine server 13, the client devices 14(1)-14(n), the video server devices 16(1)-16(n), the audio server devices 17(1)-17(n), and the text server devices 18(1)-18(n) than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 4:
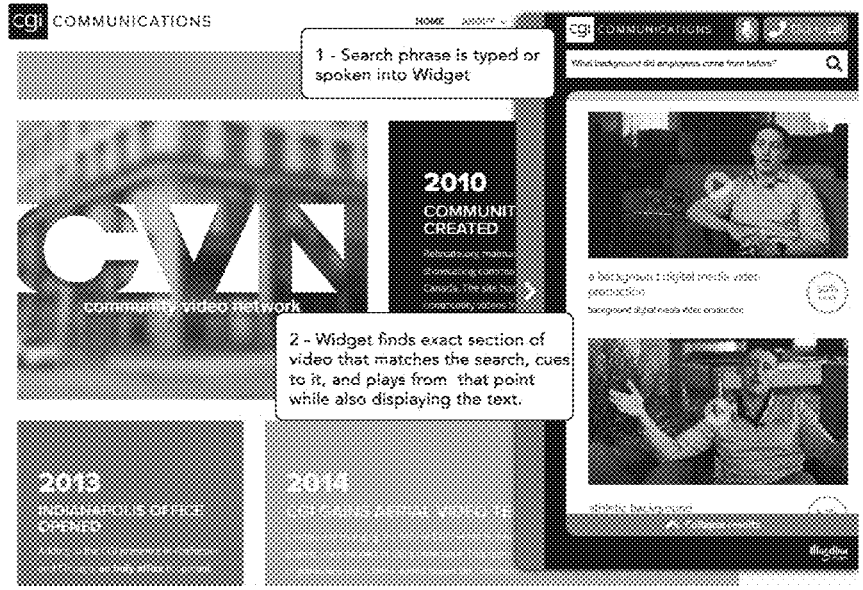
FIG. 4 is a diagram of an example of three-dimensional searching to precisely target text content.
Figure 5:
FIG. 5 is a diagram of an example of three-dimensional searching to precisely target video content.

An exemplary method for three-dimensional searching to precisely target retrieval within diverse types of content across websites will now be described with reference to FIGS. 1-3. Referring more specifically to FIG. 3, in step 100 in this example the method begins the 3D search management computing device 12 may receive a request from a mobile computing device, such as a smartphone or tablet (e.g. client device 14(1)) or a desktop device (e.g. client device 14(n)) by way of example only. Additionally, in this example as illustrated in FIGS. 4 and 5, the requesting one of the client devices 14(1)-14(n) may be executing a widget or other 3D search tool which may have been provided or previously downloaded, by way of example, to facilitate this 3D searching, such as through a voice command search with the widget.

In step 102, the 3D search management computing device 12 may determine whether the request is from a mobile computing device, such as a smartphone or tablet like client device 14(1) by way of example only, based on identifying information in the header of the received request, although other manners for identifying the type of device making the request may be used. If in step 102 the 3D search management computing device 12 determines the requests is from a mobile device, such as client device 14(1) in this example, then the Yes branch is taken to step 104.

In step 104, the 3D search management computing device 12 provides part or all of a three-dimensional searching search tool 30 to the mobile device, such as client device 14(1) in this example, which may appear at a top of a mobile site in a Web browser running on the mobile device. By way of example, the provided portion of the three-dimensional searching search tool may be customized to aspects of the requesting one of the client devices 14(1)-14(n), such as the display size and/or available functionality. By way of another example, the portion of the three-dimensional search tool 34 transmitted or otherwise previously downloaded to one or more of the client devices 14(1)-14(n) might provide one or more tools and/or interactive search dashboards to enable searching in multiple formats, such as voice or text by way of example only, and to provide precisely targeted results in multiple formats, such as audio replay or text display with highlighting of precisely targeted results in the responsive web content. By way of a further example, a widget to facilitate this searching and then the precisely targeted display and presentation of a responsive portion of video, audio, or content and which can be provided or otherwise downloaded to the requesting one of the client devices 14(1)-14(n) is shown in FIGS. 4 and 5.

If in step 102 the 3D search management computing device 12 determines the requests is not from a mobile device, such as desktop device like client device 14(n) in this example, then the No branch is taken to step 106. In step 106, the 3D search management computing device 12 provides part or all of a three-dimensional searching search tool 30 to the non-mobile device, such as client device 14(n) in this example, which appears at a top of a desktop site in a Web browser running on the mobile device. Again by way of example, the provided three-dimensional searching search tool 30 may be customized to aspects of the requesting one of the client devices 14(1)-14(n), such as the display size and/or available functionality. By way of example, the three-dimensional search tool 34 to one or more of the client devices 14(1)-14(n) might provide one or more tools and/or interactive search dashboards to enable searching in multiple formats, such as voice or text by way of example only, and to provide precisely target results in multiple formats, such as audio replay or text display with highlighting of precisely targeted results in the responsive web content.

In step 108, the 3D search management computing device 12 may receive a voice or text input of a web content search request from one of the client devices 14(1)-14(n), such as via an executing widget at the requesting one of the client devices 14(1)-14(n) as shown in the examples in FIGS. 4 and 5. The 3D search management computing device 12 may engage the search engine server 13 to search the indexed results for a response to the received request available in, by way of example, one or more of the video server devices 16(1)-16(n), the audio server devices 17(1)-17(n), and/or the text server devices 18(1)-18(n) based on the received search request.

In step 110, in this example the 3D search management computing device 12 may determine whether the identified result comprises video or audio content. If in step 104 the 3D search management computing device 12 determines the result comprises video or audio content, then the Yes branch is taken to step 112.

In step 112, the 3D search management computing device 12 may obtain the result from a responsive one of the video server devices 16(1)-16(n) or the audio server devices 17(1)-17(n) and then execute the three-dimensional searching tool 30 on the audio or video content result, although part or all of the execution of the three-dimensional searching tool 30 may be completed at other locations, such as by the requesting one of the client devices 14(1)-14(n). In this example, the executed three-dimensional searching tool 30 precisely identifies a specific location of the portion or portions of the audio or video responsive to the search request by identifying: (1) a video or audio destination page, such as the video or audio destination page for the responsive web content at one of the video server devices 16(1)-16(n) or audio server devices 17(1)-17(n) by way of example; (2) a video or audio clip address with that destination page for the relevant portion of the content; and (3) an offset distance in minutes and seconds, although other types and/or numbers of dimensions to precisely target relevant portion or portions of the content may be provided. In other examples, multiple offset distances may be identified when a response to the received request has different portions of relevant audio, video or text content and then, by way of example, the widget may (or for example the 3D search management computing device 12 might facilitate) automatically proceeding to and providing, such as be displaying or playing, each of the responsive portions. By way of further example, the 3D search management computing device 2 may rank or otherwise organize and then provide or display the relevant portions in a manner which is most responsive to the received request, such as playing a relevant portion of video followed by automatic direction to responsive textual content utilizing the offset distances.

In step 110, the 3D search management computing device 12 may provide the video or audio content result queued or otherwise directed to the precisely targeted specific location or other portion of that result responsive to the request for audio or visual display to the requesting one of the client devices 14(1)-14(n) using the determined three dimensions, although other manners for providing the result may be used. By way of example only, as shown in FIG. 5 the widget executing at the requesting one of the client devices 14(1)-14(n) may receive the precisely targeted video response to the received request and may facilitate adjusting the received video content directly to the particular relevant and responsive portion of the video content which then played so the end user at the requesting one of the client computing devices 14(1)-14(n) is not required to take any action to obtain the responsive result. A variety of instructions for mechanisms to facilitating providing responsive content may be provided by the 3D search management computing device 12 to the requesting one of the client devices 14(1)-14(n), such as highlighting responsive textual content, highlighting responsive textual content in sequence with an audio reading of the responsive portion of the textual content, or directing an end user on the requesting one of the client devices 14(1)-14(n) to a view of the responsive video content on the web page, maximizing a display of the responsive portion of the video content and then returning to the original displayed responsive page, although other types of instructions to facilitate providing the responsive content may be used.

If back in step 110 the 3D search management computing device 12 determines the result being processed does not comprises video or audio content, i.e. is text content in this example, then the No branch is taken to step 116.

In step 116, the 3D search management computing device 12 may determine whether the result comprises text content, although in other examples the results may be parsed in other manners. If in step 116, the 3D search management computing device 12 determine the results does comprises text content, then the Yes branch is taken to step 118.

In step 118, the 3D search management computing device 12 may obtain the responsive results from one or more text server devices 18(1)-18(n) and then execute the three-dimensional searching tool 30 on the text result, although part or all of the execution of the three-dimensional searching tool 30 may be completed at other locations, such as by the requesting one of the client devices 14(1)-14(n). In this example, the executed three-dimensional searching tool 30 precisely identifies a specific location of the portion or portions of the text responsive to the search request by identifying: (1) a URL destination page, such as a full uniform resource locator (URL) for the page at one of the text server devices 18(1)-18(n) by way of example; (2) a text container address at the destination page of a containing node where the particularly relevant portion of the content exists at the page. Accordingly, node in this context refers to the code container that houses the particular content relevant to the search request. For example, for text on a web page, this may be one of a plurality of paragraph nodes within a document node within a more complex layout structure; and (3) an offset distance in characters, although other types and/or numbers of dimensions to precisely target relevant portion or portions of the content may be provided. As a result, by way of example, a search of text content with the three-dimensional search tool brings you to the right page (first dimension), the right paragraph on that page (second dimension) and to a right offset distance in that paragraph so that if for example the paragraph has a thousands of words the relevant result could be way off a bottom of screen of a mobile device without this additional dimension (third dimension).

In step 120, the 3D search management computing device 12 may provide the text content result queued or otherwise directed to highlight or otherwise provide the precisely targeted specific location or other portion of that text content result for audio or visual display to the requesting one of the client devices 14(1)-14(n), although other manners for providing the highest ranked and/or other results may be used. By way of example only, as shown in FIG. 5 the widget executing at the requesting one of the client devices 14(1)-14(n) may receive the precisely targeted text response to the received request and may facilitate adjusting the received text content directly to the particular relevant and responsive portion of the text content so the end user at the requesting one of the client computing devices 14(1)-14(n) is not required to take any action to obtain the responsive result.

After steps 114 or 120 or if back in step 116, the 3D search management computing device 12 determined the result does not comprise text content and the No branch was taken, then this example of the method proceeds to step 122. In step 122, the 3D search management computing device 12 may log or otherwise record the outcome and then may return back to step 100 to wait for the next search request or may end in this example.

As illustrated and described by way of the examples herein, this technology enables effective three-dimensional searching to precisely target retrieval within diverse types of content across websites. With examples of this technology, an end user can be precisely guided to an exact space or time where a relevant portion of diverse content responsive to the search request is located. Additionally, with examples of this technology a search of diverse content can be initiated via any input format for content in any format, such as voice as input to search for text, text as input to search for video, or voice to search for video or audio segments by way of example only.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for three-dimensional searching to precisely target retrieval within diverse types of content, the method comprising:

retrieving, by a computing device, web content in response to a received request from a client device;

determining, by the computing device, whether the responsive web content comprises a video and/or audio result or a text result;

identifying, by the computing device, a destination page, an address within the page, and an offset distance from a starting point at the address to a correlated responsive portion of the web content to the received request, wherein the identifying is adjusted based on the determination of whether the responsive web content comprises the video and/or audio result or the text result; and providing, by the computing device, the responsive web content with the identified destination page, the address, and the offset distance to the requesting client device.

2. The method as set forth in claim 1 further comprising: determining, by the computing device, one of a plurality of content types for the responsive web content.

3. The method as set forth in claim 2, wherein the determined one of the plurality of types of content comprises video or audio content, the identified destination page comprises a video or audio destination page, the address comprises a video or audio clip address within the page, and the offset distance comprises an offset distance in minutes and seconds from the starting point at the video or audio clip address.

4. The method as set forth in claim 2, wherein the determined one of the plurality of types of content comprises text content, the identified destination page comprises a uniform resource locator (URL) destination page, the address comprises a text container address within the page, and the offset distance comprises an offset distance in characters from the starting point at the text container address.

5. A computing device, comprising memory comprising programmed instructions stored thereon and one or more processors configured to be capable of executing the stored programmed instructions to:
retrieve web content in response to a received request from a client device;
determine whether the responsive web content comprises a video and/or audio result or a text result;
identify a destination page, an address within the page, and an offset distance from a starting point at the address to a correlated responsive portion of the web content to the received request, wherein the identifying is adjusted based on the determination of whether the responsive web content comprises the video and/or audio result or the text result; and
provide the responsive web content with the identified destination page, the address, and the offset distance to the requesting client device.

6. The device as set forth in claim 5 wherein the one or more processors are further configured to be capable of executing the stored programmed instructions to:
determine one of a plurality of content types for the responsive web content.

7. The device as set forth in claim 6, wherein the determined one of the plurality of types of content comprises video or audio content, the identified destination page comprises a video or audio destination page, the address comprises a video or audio clip address within the page, and the offset distance comprises an offset distance in minutes and seconds from the starting point at the video or audio clip address.

8. The device as set forth in claim 6, wherein the determined one of the plurality of types of content comprises text content, the identified destination page comprises a uniform resource locator (URL) destination page, the address comprises a text container address within the page, and the offset distance comprises an offset distance in characters from the starting point at the text container address.

9. A non-transitory computer readable medium having stored thereon instructions comprising executable code which when executed by one or more processors, causes the one or more processors to:
retrieve web content in response to a received request from a client device;
determine whether the responsive web content comprises a video and/or audio result or a text result;
identify a destination page, an address within the page, and an offset distance from a starting point at the address to a correlated responsive portion of the web content to the received request, wherein the identifying is adjusted based on the determination of whether the responsive web content comprises the video and/or audio result or the text result; and
provide the responsive web content with the identified destination page, the address, and the offset distance to the requesting client device.

10. The non-transitory computer readable medium of claim 9, wherein the executable code when executed by the one or more processors further causes the one or more processors to:
determine one of a plurality of content types for the responsive web content.

11. The non-transitory computer readable medium of claim 10 wherein the determined one of the plurality of types of content comprises video or audio content, the identified destination page comprises a video or audio destination page, the address comprises a video or audio clip address within the page, and the offset distance comprises an offset distance in minutes and seconds from the starting point at the video or audio clip address.

12. The non-transitory computer readable medium of claim 10 wherein the determined one of the plurality of types of content comprises text content, the identified destination page comprises a uniform resource locator (URL) destination page, the address comprises a text container address within the page, and the offset distance comprises an offset distance in characters from the starting point at the text container address.

* * * * *